Jan. 25, 1955 L. P. CROSMAN 2,700,503

ELECTRONIC BINARY MULTIPLYING COMPUTER

Filed April 6, 1950 4 Sheets-Sheet 1

INVENTOR.
LORING P. CROSMAN
BY Ralph W. E. Bitner
ATTORNEY

ELECTRONIC BINARY MULTIPLYING COMPUTER

Filed April 6, 1950 4 Sheets-Sheet 2

777 X 333 = 258741

| | | | | | | | | | |
|---|---|---|---|---|---|---|---|---|---|
| 5 SHIFT PULSES | | | | | | 3 | 3 | 3 | MULTIPLIER |
| | 3 | 3 | 3 | | | | | | |
| | 2 | 3 | 3 | | | 7 | 7 | 7 | MULTIPLICAND |
| | 1 | 3 | 3 | | 1 | 5 | 5 | 4 | |
| 1 SHIFT PULSE | | 3 | 3 | | 2 | 3 | 3 | 1 | |
| | 3 | 3 | | 2 | 3 | 3 | 1 | | |
| | 2 | 3 | | 2 | 4 | 0 | 8 | 7 | |
| | 1 | 3 | | 2 | 4 | 8 | 6 | 4 | |
| 1 SHIFT PULSE | | 3 | | 2 | 5 | 6 | 4 | 1 | |
| | 3 | | 2 | 5 | 6 | 4 | 1 | | |
| | 2 | | 2 | 5 | 7 | 1 | 8 | 7 | |
| | 1 | | 2 | 5 | 7 | 9 | 6 | 4 | |
| 1 SHIFT PULSE | | | 2 | 5 | 8 | 7 | 4 | 1 | |
| | | 2 | 5 | 8 | 7 | 4 | 1 | | PRODUCT |

INVENTOR.
LORING P. CROSMAN

BY Ralph E. Bitner

ATTORNEY

INVENTOR.
LORING P. CROSMAN
BY Ralph W. E. Bitner
ATTORNEY

INVENTOR.
LORING P. CROSMAN
BY Ralph W. E. Bitner
ATTORNEY 2,700,503

ELECTRONIC BINARY MULTIPLYING COMPUTER

Loring P. Crosman, Darien, Conn., assignor to Remington Rand Inc., New York, N. Y., a corporation of Delaware Application April 6, 1950, Serial No. 154,407

7 Claims. (Cl. 235—61)

This invention relates to a circuit for multiplying in which both the multiplier and multicplicand are recorded in a single accumulator. It has particular reference to a circuit for multiplying by repeated addition in an electronic accumulator where digit shifting from one order to another is possible.

Multiplying by repeated addition in electronic accumulators is old and has been performed in a manner based on the mechanical computing machine. The procedure includes entering the multiplicand into the lower orders of the accumulator a number of times which is equal to the value of the highest order digit in the multiplier. Then the accumulated amount is shifted one order to the left and the multiplicand entered a number of times equal to the next higher digit value. This process is continued until all the digit values of the multiplier have been used to enter the multiplicand. The result is the product.

One of the difficulties of the above described method is the control of the cycling process so that the multiplicand may be entered the correct number of times as called for by the value of the multiplier digits. This generally is done by employing a separate counting unit which is controlled by the value of the multiplier digits. An additional accumulator unit is generally necessary.

The present invention uses no additional accumulator but instead employs some of the unused orders in the main accumulator unit to perform the controlling action. An accumulator which is to accommodate the usual multipliying process in which ten digits may be multiplied by ten other digits must have at least twenty denominational orders. When the multiplicand is first entered into such an accumulator only ten orders are being used. As the process of repeated addition is continued more denominational orders are used and when the product is finally obtained all twenty orders may be employed.

The present invention uses twenty one denomination orders for a ten by ten multiplying process in which both the multiplier and multiplicand are entered into the same accumulator. By the use of this circuit an added flexibility is obtained since a five by fifteen digit multiplication is possible under the new arrangement. Any two numbers may be multiplied together provided the sum of their combined digit orders does not exceed twenty.

One of the objects of this invention is to provide an improved circuit for mutiplying which avoids one or more of the disadvantages and limitations of prior art circuits.

Another object of the invention is to reduce the number of tubes in an electronic computer.

Another object of the invention is to obtain a more flexible computing structure.

Another object of the invention is to simplify the control circuit which automatically causes the repeated additions, shifts, and other processes necessary to obtain a product.

The invention comprises a circuit for multiplying a multiplicand by a multiplier to obtain a product in an electronic accumulator. The accumulator is subdivided into denominational orders and has circuit carry means for carrying from any order to the next higher order. The accumulator also has circuit means for shifting the accumulated digit values from one order to the next higher order. A shift generator is provided for supplying pulses to actuate the shifting circuit and a counter is used to count the number of shift operations during a multiplying action. To control the shift counter and shift generator, two gate stages are employed. One gate connects the shift counter to the shift generator whenever counts are to be made and disconnects it at all other times. A second gate senses the presence of a zero in the highest order of the accumulator and controls the action of the shift generator accordingly. The counter in the application hereinafter described covers a 3×3 multiplying circuit and counts from zero to seven. While the multiplier may be applied to the accumulator in the highest orders, it is convenient to apply the multiplier digits in the lower orders and then shift them to the higher orders, counting the shifts as they occur. After the above described action, the product will appear in the lowest denominational orders of the accumulator and this value may be used for other calculations, read out by a printing attachment, or transferred to some other storage device. The present application is concerned only with the circuit for multiplying two numbers to get a product.

For a better understanding of the present invention, together with other and further objects thereof, reference is made to the following description, taken in connection with the accompanying drawings.

Figure 1:
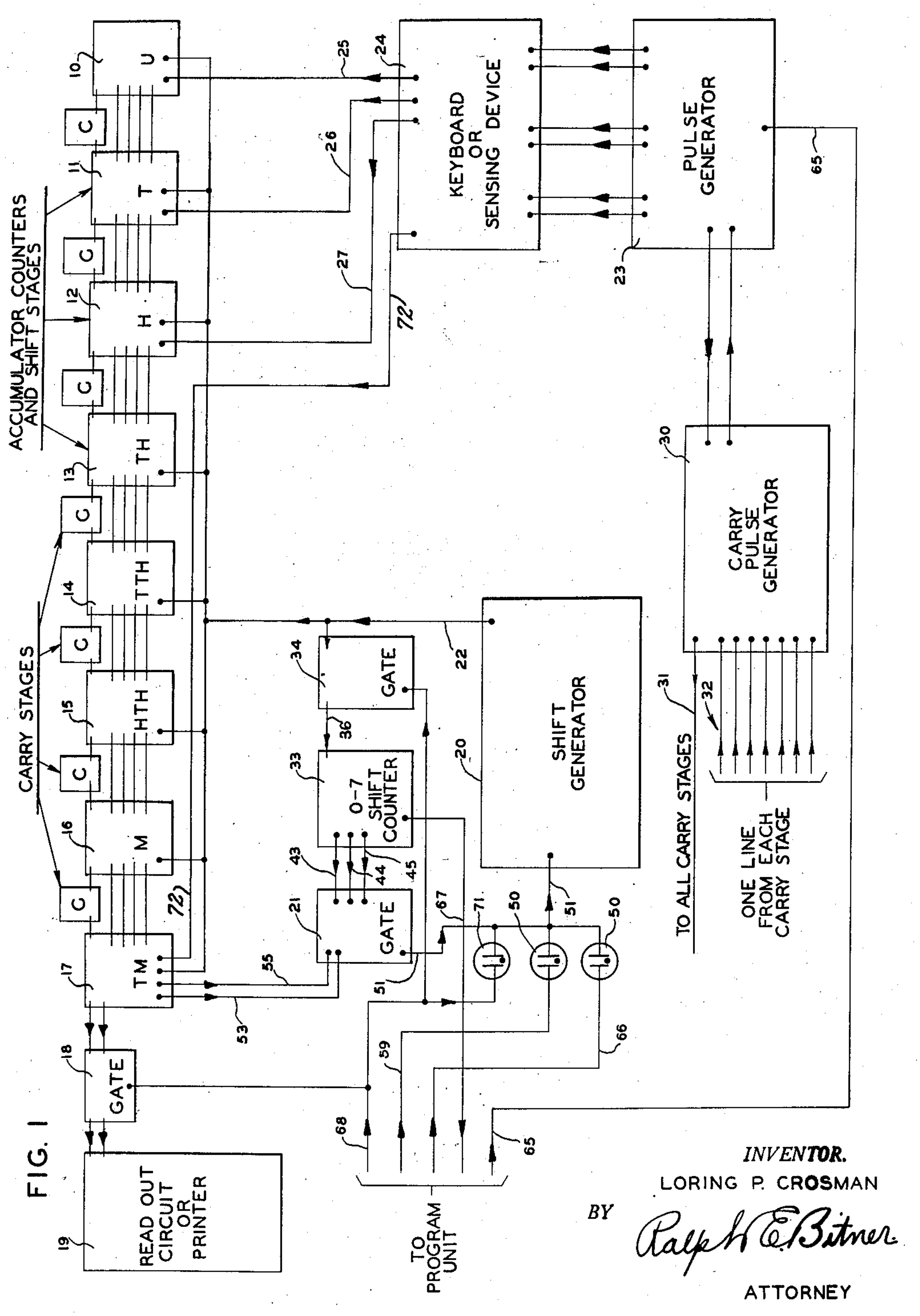
Fig. 1 is a circuit diagram in which all the major components are indicated by blocks.

Referring now to Fig. 1, the accumulator comprises eight counters 10 to 17, inclusive. Intermedate the counter circuits are seven carry stages employed to transfer carry amounts from the lower counter to the next higher counter. The accumulator circuits and the intermediate carry stages have been fully described and claimed in U. S. Patents 2,579,174 and 2,512,851 to Loring P. Crosman, and in application Serial No. 83,378, filed March 25, 1949. These applications include information on the keyboard for entering values into the accumulator counters. Associated with the highest order counter 17 is a gate 18 and a read out device or printer 19. One form of read out device which can be applied efficiently to this form of circuit has been described in U. S. Patent No. 2,512,860, issued to William H. Henrich.

The highest order counter in the accumulator is required to subtract (rather than add) a one (1) from the digit value recorded there at the same time a number is being added to the lower order counters. This highest order counter may be a modification of the counters used in the lower orders. The necessary modifications are described in detail in the following:

Associated with the accumulator counters is a shift generator 20 which is controlled by a gate 21 or may be controlled by a program unit (not shown) to send a shift pulse through neon tubes 50 to a "start" conductor 51 which controls the shift generator and causes one or more shift pulses to be sent over conductor 22 to all the accumulator counters, causing the digit stored in that counter to be transferred to the next higher counter. The details of this shift generator and the shift circuits associated with the accumulator counters have been described in an application S. N. 91,060, filed May 3, 1949, by Loring P. Crosman, now Patent 2,585,630, issued February 12, 1952. Other types of shift generators and shifting mechanism have been used and may be applied with equal facility to this circuit. A pulse generator 23 described in the aforementioned Patent 2,512,851, delivers pulses to a keyboard or similar switch operating device 24, which transmits proper digit values to the three lowest counters in the accumulator over conductors 25, 26, and 27. It should be noted here that the accumulators accommodates a 3×3 multiplication but has eight counters, or two more than would normally be used in a mechanical multiplier.

A carry pulse generator 30 is employed to send carry pulses to all the carry stages over conductor 31. Each carry stage is connected by a conductor 32 to the carry pulse generator to inform the generator whether or not a carry value has been stored in that stage, and whether or not a pulse should be supplied to transfer such value to the next higher order counter. The circuit is controlled by any form of program unit which starts the pulse generator at the beginning of the operation and then disposes of the product after the multiplication operation has been completed. Such a program unit will not be described here since its operation is unnecessary for the operation of the multiplying circuit. The control units necessary to control the shifting during the multiplying operation are contained in the gate 21, a counter 33, and another gate 34. The counter 33 is set to count only eight pulses and it receives these pulses through an electronic gate 34 which is connected directly to the shift generator 20 so that the shift pulses transmitted over conductor 22 may pass through gate 34 during the multiplying action and the counter on the counter 33. An output connection from the counter 33 to gate 21 is provided so that the counter disables the gate 21 on a count of eight or when the counter is zeroized.

Figures 2, 3:
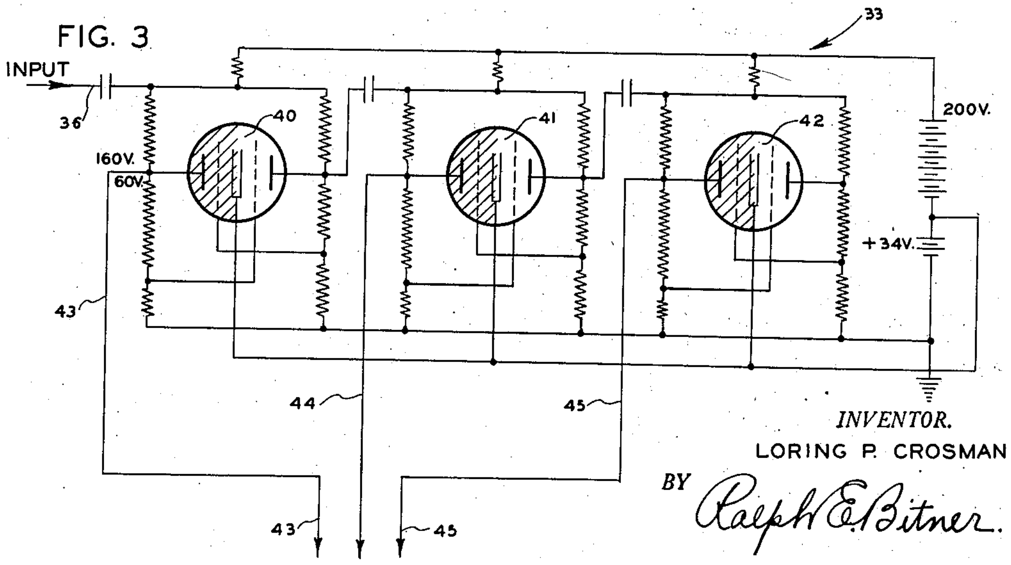
Fig. 2 is a chart to illustrate an example of multiplication, and show how the digits are shifted and added to produce the required result.
Fig. 3 is a detailed wiring diagram showing the circuit connections of the counter which counts the number of digit shifts.

Fig. 2 is a chart to indicate the operation of the device and show the disposition of the digits during the multiplication operation. In this figure, eight vertical columns are shown which correspond to the eight accumulator counters shown in Fig. 1. The succession of horizontal rows indicates the various operations which are necessary to obtain a product using this method. The example used in this figure employs a multiplicand (777) and a multiplier (333), both having three digits. The first row shows the multiplier entered into the three lower counters in the accumulator. The second row shows these digit values after they have been shifted to the higher order counters. This operation requires five shift pulses to effect the transfer. The third row shows a unit digit value subtracted from the highest order accumulator while the multiplicand has been added to the three lower orders of the accumulator. The fourth row shows another subtraction of a unit digit in the highest order of the multiplicand added a second time in the three lower orders. The fifth row shows that the highest order accumulator counter has been reduced to zero and a third multiplicand value added in the three lower orders. At this point the gate 21 senses the zero value of the highest order counter 17 and transmits that information to the shift generator 20, thereby causing a shift of all digit values in the accumulator one order to the left. The above described operation is continued until all three digits in the multiplier have been reduced to zero. The number shown in the lowest row in Fig. 2 is the product of the multiplicand and the multiplier and is the desired result.

Fig. 3 is a detailed wiring diagram of the shift counter 33 which counts pulses received over an input line 36. The counter counts to seven and on the eighth count reverts to its zero position. Any type counter might be used in this circuit. The present binary counter was selected because of its simplicity and because only three vacuum tubes are required. The three trigger tubes 40, 41, 42 are all conducting on the left when the count of zero is indicated. If a count of other than zero is registered in the counter 33, one, two, or all three of the conductors 43, 44, 45 will carry a higher positive potential which is communicated to gate 21 (Fig. 5) to control the shift generator.

Figure 4:
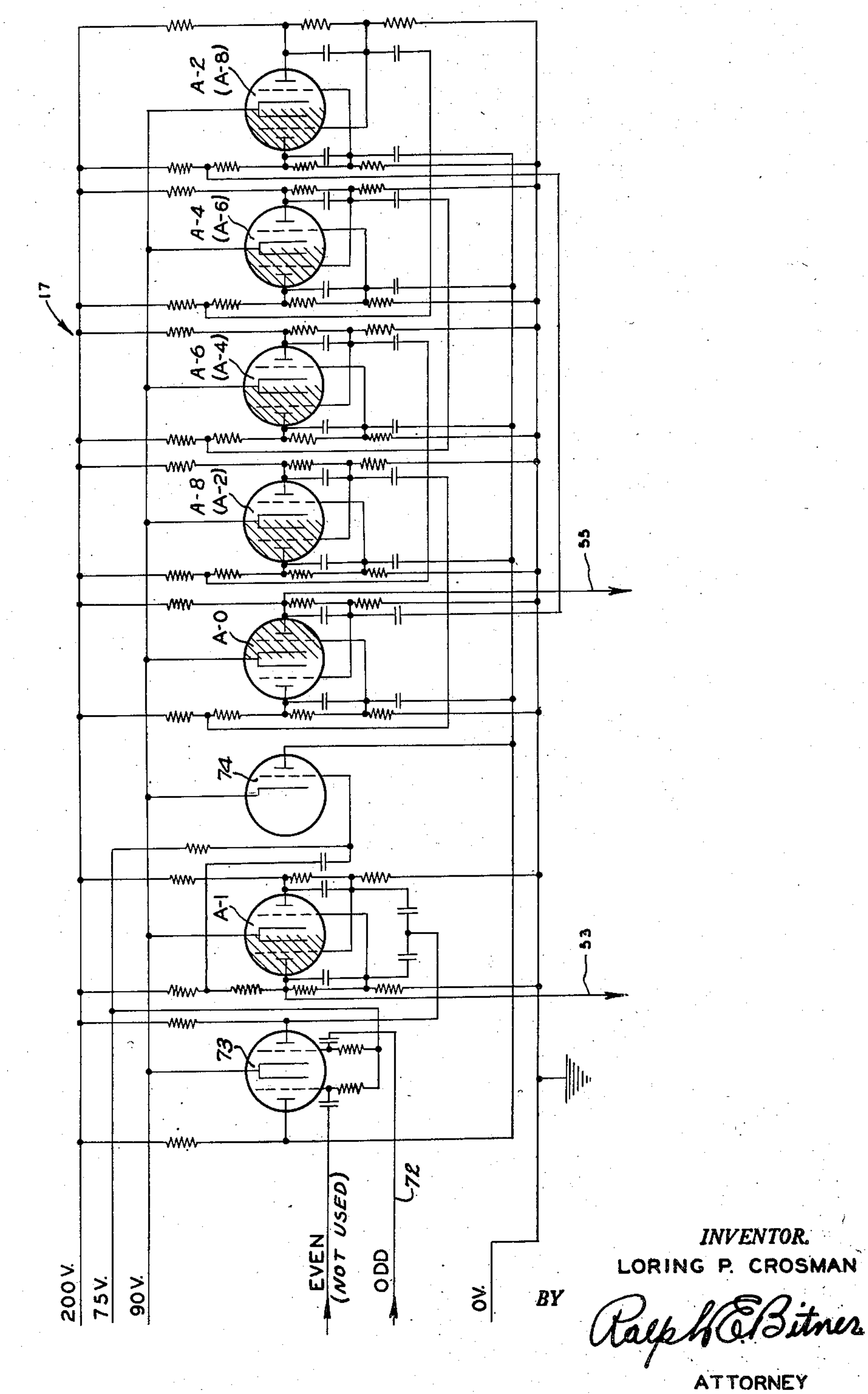
Fig. 4 is a detailed circuit diagram of the highest accumulator counter, indicating the circuit connections whereby a signal is sent to a control circuit to signify the fact that no digit value is left in that order.

Recall that while the lower order counters 10–16 of the accumulator, which may be of the type described in detail in U. S. Patent 2,579,174 to Loring P. Crosman, must add entered values to previous contents, the highest order counter 17 must subtract a one from its previous contents each time a number is added in the lower order counters. This highest order counter may be a modification of the adding counters used in the lower orders and described in the aforementioned U. S. Patent 2,579,174. A suitable modification for subtracting is shown in Fig. 4. There the output of the A–1 trigger which is applied to the even triggers A–0, A–2, A–4, and A–8, is taken from the left instead of from the right anode circuit so that conduction will be shifted from one even trigger to the next each time the odd trigger A–1 changes from the zero manifesting state to the one manifesting state rather than vice versa. Also the even triggers designated A–2, A–4, A–6 and A–8 in the aforementioned U. S. Patent 2,579,174 (and in parenthesis in Fig. 4) are here re-designated A–8, A–6, A–4, and A–2 so that the value manifested by the counter descends with the application of input pulses rather than ascends. Multiplier digit values are shifted into the counter from the next lower counter in accordance with the re-designation. For example, the digit eight would be shifted into trigger A–8 or (A–2) rather than into trigger A–2 or (A–8); eight input pulses over line 72 would then be required to return the counter to zero instead of two input pulses as would be required in the adding counter in the absence of the foregoing modifications. The zero reading conduction pattern within the triggers is shown by the shading on one side of each of the triggers.

Input pulses, to cause the counter 17 (Fig. 4) to subtract one each time a number is added to the lower orders, are supplied from the keyboard or sensing unit 24 (Fig. 1) over line 72. Each time the pulse generator 23 is actuated to transmit pulses representing the multiplicand digits to the three lowest accumulator orders 10–12, a single pulse representing the digit one is transmitted over line 72 to the highest order counter 17.

Conductor 53 is connected to the left anode of trigger stage A–1 and conductor 55 is connected to the right anode of trigger stage A–0. When both trigger stages indicate a registered value of zero, the anodes connected to conductors 53 and 55 are both at low potential (about 60 volts) and thus in a manner explained below, enable the actuation of the shift generator 20. The odd impulse received over line 72 passes through amplifier 73 and triggers A–1, which in turn passes the impulse through amplifier 74 to A–0. The detailed operation of these two amplifiers 73 and 74 is contained in U. S. Patent 2,579,174.

Figure 5:
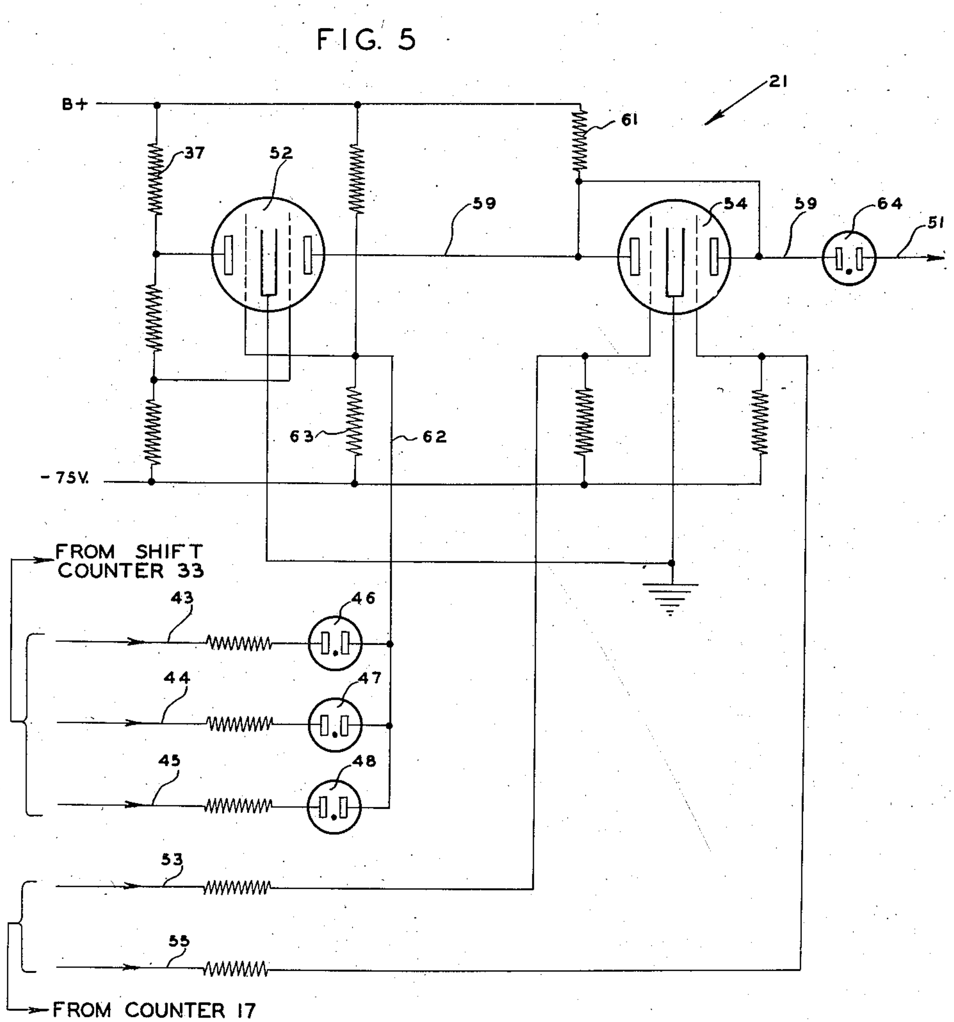
Fig. 5 is a detailed circuit diagram of the gate which controls the shift generator.

Fig. 5 is a detailed wiring diagram of gate 21 which is the major control of the shift generator 20. Control potentials from the highest order counter 17 are sent to control stage 54 by conductors 53 and 55. Control potentials from the shift counter 33 are sent to control stage 52 by conductors 43, 44, and 45. The result of these controlling potentials is sent over conductor 51 to the shift generator 20 which either sends out another shift pulse when the potential of conductor 51 is high or does nothing when this potential is low.

Stage 54 contains two control electrodes each connected to one of the control conductors 53, 55, and to a biasing potential of —75 volts. When both conductors are at their lower potential (60 volts) the control electrodes in stage 54 are below the cut-off value and there is no anode-cathode current through the tube.

If the accumulator 17 shown in Fig. 4 has been actuated to record any digit value other than zero, then one or both conductors 53, 55 will transmit a higher value of potential (160 volts) to stage 54, causing one or both sides to conduct and drawing enough current through resistor 61 to keep the voltage of the anodes in stage 54 at a low value. Under these conditions neon lamp 64 is not lighted and there is no signal sent over conductor 51 to the shift generator to cause it to send out a shift pulse.

The left side of stage 52 is an inverter while the right side serves the same function as either of the triodes in stage 54. Signals are received from the shift counter 33 over conductors 43, 44, and 45, through the associated neon lamps and conductor 62 to the control electrode of the inverter. When the shift counter 33 (see Fig. 3) registers a count of zero, eight, sixteen . . ., conductors 43, 44, and 45 are at low potential and the neon lamps 46, 47, and 48 (Fig. 5) will not receive enough voltage to light them. The left control electrode of stage 52 remains at a potential considerably below the cut-off value and the left side of the stage passes no current between the anode and cathode. This results in a zero potential for the right control electrode and current flows through the right anode circuit to reduce the voltage on conductor 59 and keep lamp 64 unlighted, thereby sending no signal to the shift generator.

When a count, other than zero or eight, is registered in counter 33, one or more of the conductors 43, 44, and 45 receive a higher potential and one of the neon lamps 46, 47, or 48 is lighted. When any one of the lamps is lighted the potential of conductor 62 is raised approximately 34 volts, sending a current through resistor 63 and proportionally raising the potential of the left control electrode to a value which sends a current from the left anode through stage 52 to the left cathode to ground. This current through resistor 37 is sufficient to lower the voltage on the right control electrode beyond the cut-off value so that the right side of stage 52 becomes non-conducting and the voltage of conductor 59 is not lowered due to the action of stage 52.

It will be evident from the above descriptions that conductors 59 and 51 will remain at a low potential for all conditions of the accumulator counter 17 and the shift counter 33 except when the accumulator 17 registers zero and the shift counter registers a value other than zero. A high potential on conductor 59 lights neon lamp 64 and sends a high voltage over conductor 51 to cause the shift generator 20 to send out one or more shift pulses.

The operation of the circuit is as follows: Assuming that the entire accumulator is set at zero and the shift counter also is at zero, a number (multiplier) is set in the keyboard 24. Then a start pulse is applied over conductor 65 to enter the number into the lower orders of the accumulator. At this time there will be no shift operation because the shift counter is set at zero and such a condition closes gate 21. Next, a pulse is sent from the program unit (not shown) over conductor 66 to control the shift generator to send a single shift pulse to all the accumulator orders. This pulse is sent over conductor 22 and passes through gate 34 to shift counter 33 registering a count of one. Now, with the highest accumulator counter 17 still registering a zero, gate 21 will transmit a voltage to the shift generator to cause it to send a series of shift pulses to the accumulator to move the multiplier until it occupies the three highest orders 17, 16, and 15. As soon as an amount is entered into the highest counter 17, the shift action stops since gate 21 is then closed.

Next, the multiplicand is entered into the lower orders of the accumulator by the keyboard 24, and at the same time a "one" is subtracted from the highest order 17. The addition of the multiplicand value and the subtraction of a one from the highest order is continued at a regular predetermined rate until the product is obtained. As each digit of the multiplier is reduced to zero the shift generator is energized and all the digits in the accumulator are shifted one place to the left before the next addition of the multiplicand value.

When the shift counter has received eight pulses from the shift generator it again registers zero and the shifting action stops. The shift counter also signals the program unit by way of conductor 67 so that there will be no more start pulses sent over conductor 65 to continue addition of the multiplicand.

If it is now desired to print the product obtained, a voltage is sent over conductor 68 from the program unit which opens gate 18, energizes the shift generator through neon lamp 71, and closes gate 34. The accumulator values are then shifted through gate 18 to the printer or other read-out device during which operation the shift counter is inactive because gate 34 has been closed.

While there have been described and illustrated specific embodiments of the invention, it will be obvious that various changes and modifications may be made therein without departing from the field of the invention which should be limited only by the scope of the appended claims.

What is claimed is:

1. A circuit for multiplying a multiplicand by a multiplier comprising, an electronic accumulator subdivided into orders with circuit means for carrying from any order to the next higher order and circuit means for shifting all accumulated digit values from one order to the next higher order, actuating means for applying digit manifesting signals to the accumulator, said actuating means including a pulse generator connected through a digit selecting circuit to the accumulator, a shift generator connected to the shift circuit means for supplying shift pulses when a shift operation is called for, a counter for counting the number of shift operations during a multiplying cycle, a first electronic gate circuit connected between the shift generator and the counter for transmitting shift pulses to the counter, and a second electronic gate circuit connected between the highest accumulator order, the counter and the shift generator for causing a shift action whenever a zero is recorded in the highest order and the counter is not zeroized.

2. A circuit for multiplying a multiplicand by a multiplier comprising, an electronic accumulator subdivided into orders with circuit means for carrying from any order to the next higher order and circuit means for shifting all accumulated digit values from one order to the next higher order, actuating means for applying digit manifesting signals to the accumulator, said actuating means including a pulse generator connected through a digit selecting circuit to the accumulator, a shift generator connected to the shift circuit means for supplying shift pulses when a shift operation is called for, a counter for counting the number of shift operations during a multiplying cycle, a first electronic gate circuit connected between the shift generator and the counter for transmitting shift pulses to the counter, a second electronic gate circuit connected between the highest accumulator order, the counter and the shift generator for causing a shift action whenever a zero is recorded in the highest order and the counter is not zeroized, and means for reducing by one the value manifested by the highest accumulator order each time the multiplicand signals are applied to the lower accumulator orders.

3. A circuit for multiplying a multiplicand by a multiplier comprising, an electronc accumulator subdivided into orders with circuit means for carrying from any order to the next higher order and circuit means for shifting all accumulated digit values from one order to the next higher order, actuating means for applying digit manifesting signals to the accumulator, said actuating means including a pulse generator connected through a digit selecting circuit to the accumulator, a shift generator connected to the shift circuit means for supplying shift pulses when the input circuit of the shift generator receives an actuating pulse, a counter for counting the number of shift operations during a multiplying cycle, a first electronic gate circuit connected between the counter and the shift generator for transmitting shift pulses to the counter, a second electronic gate circuit connected between the highest accumulator order, the counter and the shift generator for causing a shift action whenever a zero is recorded in the highest order and the counter is not zeroized, and means for reducing by one the value manifested by the highest accumulator order each time the multiplicand signals are applied to the lower accumulator orders.

4. A circuit for multiplying a multiplicand by a multiplier comprising, an electronic accumulator subdivided into orders with circuit means for carrying from any order to the next higher order and circuit means for shifting all accumulated digit values from one order to the next higher order, actuating means for applying digit manifesting signals to the accumulator, said actuating means including a pulse generator connected through a digit selecting circuit to the accumulator, a shift generator connected to the shift circuit means for supplying shift pulses when the input circuit of the shift generator receives an actuating pulse, a counter for counting the number of shift operation during a multiplying cycle, a first electronic gate circuit connected between the counter and the output of the shift generator under control of a program circuit for transmitting shift pulses to the counter, a second electronic gate circuit connected between the highest accumulator order, the counter and the input of the shift generator, said second gate adapted to be open only when a zero value is in the highest order and arranged to cause a shift action when in the open condition, and means for reducing by one of the value manifested by the highest accumulator order each time the multiplicand signals are applied to the lower accumulator orders.

5. A circuit for multiplying a multiplicand by a multiplier comprising, an electronic accumulator subdivided into orders for accumulating digit values, circuit means for carrying from one order to the next higher order, circuit means operated by a shift pulse for shifting all accumulated digit values from one order to the next higher order, actuating means for applying digit manifesting signals to the accumulator, a shift generator connected to the shift circuit means for supplying one or more shift pulses to said orders when the input circuit of the shift generator receives an actuating pulse, a counter for counting the number of shift operations during a multiplying cycle, a first electronic gate circuit connected between the output of the shift generator and the input to the counter under control of a program circuit to tranmitting shift pulses to the counter, a second electronic gate circuit connected between the highest accumulator order, the counter and the input of the shift generator, said second gate open to transmit a signal from the highest order to the shift generator only when a zero value is in the highest order and when the counter is not in its zeroized condition, and means for reducing by one the value manifested by the highest accumulator order each time the multiplicand signals are applied to the lower accumulator orders.

6. In combination, an electronic accumulator comprising a plurality of denominational counters adapted to add in response to applied signals and at least one denominational counter adapted to subtract in response to applied signals, means for effecting carries between said denominational counters, means for shifting accumulated values from one denominational counter to the next higher order counter, means for applying digit manifesting signals to the denominational counters of the accumulator, a shift counter operatively coupled with the shifting means for counting the number of shifts, and means responsive to the denominational counter adapted to subtract, and to the shift counter for controlling the application of shift pulses to the denominational counters of the accumulator.

7. Apparatus for multiplying a multiplicand by a multiplier by repeated additions of the multiplicand, comprising an electronic accumulator with a plurality of denominational counters, means for carrying between denominational counters, means for shifting the contents of the accumulator, and means for registering the multiplier and multiplicand in the accumulator, certain denominational counters of the accumulator being used initially to register digits of the multiplier and subsequently to accumulate digits of the product after digits of the multiplier have been shifted out.

References Cited in the file of this patent

UNITED STATES PATENTS

| | | |
|---|---|---|
| 2,404,047 | Flory | July 16, 1946 |
| 2,442,428 | Mumma | June 1, 1948 |